3,782,987
VICINAL HALOHYDRINS PREPARED FROM OLEFINS CONTAINING 25–50 CARBON ATOMS
William A. Bomball, Raymond L. Drury, Jr., Charles S. Nevin, and Ralph C. Witmer II, Decatur, Ill., assignors to A. E. Staley Manufacturing Company, Decatur, Ill.
No Drawing. Filed Jan. 31, 1972, Ser. No. 222,292
Int. Cl. C08h 9/06
U.S. Cl. 106—271                           13 Claims

ABSTRACT OF THE DISCLOSURE

A preparation of salt-free long-chain vicinal halohydrins by reacting olefin containing 20 to 50 carbon atoms with hypohalite in aqueous emulsion comprising surface active agent at a temperature above the melting point of olefin; compositions comprising long-chain vicinal halohydrins and surface active agents; aqueous emulsions of long-chain vicinal halohydrins and surface active agents; and their use in treating fibrous products.

---

This invention relates to the preparation and use of higher olefin halohydrins and compositions comprising higher olefin halohydrins.

Polyethylene emulsions have been used for a number of years in textile treating compositions, floor polishes, water based inks, etc. For example, polyethylene emulsions are used as softeners, plasticizers and lubricants in single additive (self-finishes) for textiles to impart aesthetic and utilitarian properties, such as to increase the abrasion and wear resistance of fabrics woven from natural and synthetic fibers, to improve the "hand" (softness or feel) of fabrics and to improve their drape and sewing qualities.

Polyethylene emulsions are used together with cross-linking agents (normally called thermosetting resins), such as dimethylol dihydroxyethylene urea, hexamethylol melamine, melamine-formaldehyde resins, etc., to produce most durable press fabrics. Whereas the thermosetting resins are employed for crease-proofing, stabilizing and mechanical finishing of textiles, the emulsified polyethylene is used to repair or improve the mechanical properties of the fabric, to produce a particular hand, to reduce the drying or harshness imparted by the thermosetting resins, as simple processing aids in reducing friction in high pressure mechanical calendaring or embossing machines, etc. Alternatively, the polyethylene emulsion can be used without thermosetting resins in an after-treatment to modify resin-treated durable press fabrics that have been improperly finished.

As indicated above, emulsified polyethylene is also used in latex floor polishes as a wax to replace or supplement natural waxes and in water-based flexographic and gravure inks.

Although polyethylene emulsions have numerous advantageous properties, they are relatively expensive. For example, large quantities of expensive surface active agents must be employed to emulsify the very hydrophobic, a relatively low cost unmodified polyethylenes. In order to reduce the amount of surface active agent necessary to emulsify polyethylene, modified polyethylenes have been developed, such as oxidized polyethylene, polyethylene telomers, etc. and polyethylene emulsions have been produced by high pressure emulsion polymerization of gaseous ethylene. However, these processes result in relatively expensive polyethylene emulsions.

The general object of this invention is to provide a low cost polyethylene emulsion substitute. The principal object of this invention is to provide a low cost polyethylene emulsion substitute suitable for use alone or together with emulsified polyethylene as a textile softener, plasticizer or lubricant. Other objects appear hereinafter.

In one aspect, this invention is an aqueous emulsion comprising a surface active agent and an aliphatic vicinal halohydrin containing on an average from about 20 to 50 carbon atoms, wherein the halo group of said halohydrin is either chloro or bromo.

In a second aspect, this invention is an aqueous emulsion comprising a surface-active agent, emulsified polyethylene and an aliphatic vicinal halohydrin containing on an average from about 20 to 50 carbon atoms wherein the halo group of said halohydrin is either chloro or bromo.

In a third aspect, this invention is a process which comprises applying to a fibrous material a relatively salt-free aqueous emulsion comprising a surface active agent and an aliphatic vicinal halohydrin containing on an average from about 20 to 50 carbon atoms, wherein the halo group of said halohydrin is either chloro or bromo.

In another aspect, this invention is a method of producing a relatively salt-free aliphatic vicinal halohydrin which comprises reacting an aqueous emulsion comprising a surface active agent and a liquified, normally solid olefin having on an average from about 20 to 50 carbon atoms with between 0.45 and 0.75 moles, preferably from about 0.50 to 0.70 moles, hypohalite per mole of olefinic unsaturation to form a metastable vicinal halohydrin emulsion and partitioning and halohydrin from the aqueous phase of said emulsion.

We have now found that the objects of this invention can be attained with an aqueous emulsion comprising a surface active agent, an aliphatic vicinal halohydrin containing on an average from about 20 to 50 carbon atoms, wherein said halohydrin is either a chlorohydrin or a bromohydrin. If the halohydrin has less than 20 carbon atoms, the applied halohydrin lacks the necessary properties to function as a polyethylene supplement or replacement in textile treating compositions, particularly in imparting the desired hand to durable press textiles. On the other hand, as the number of carbon atoms in the halohydrin increases, it becomes increasingly difficult to form the halohydrin under reasonable operating conditions. Accordingly, the halohydrins of this invention have on an average from about 20 to 50 carbon atoms, preferably about 32 to 40 carbon atoms. The halohydrin emulsions of this invention (halohydrin, surface active agent and water) can be used without other additives to treat textiles or can be used in combination with various treating agents, such as emulsified polyethylene, water-repellent agents, dye-fixing agents and thermosetting resins. Durable press fabrics treated with the halohydrin emulsions of the present invention have a surprisingly durable finish in spite of the halohydrins relatively low molecular weight and withstand many launderings without losing the beneficial properties of the halohydrin emulsion. Further, applicants' halohydrin emulsions, when used alone or together with emulsified polyethylene, are substantially lower cost than prior polyethylene emulsions.

Briefly, halohydrin emulsions of this invention are prepared by emulsifying an aliphatic vicinal halohydrin containing on an average from about 20 to 50 carbon atoms with water and compatible surface active agent or agents, capable of emulsifying the halohydrin and/or any other components used with the halohydrin, such as polyethylene, and producing a stable emulsion. Although the emulsions can be prepared with nonionic, anionic, or cationic surface active agents, the nonionic surface active agents are preferred for textile applications because of their compatibility with substantially all textile finishing chemicals. Nonionic agents are compatible with both anionic and cationic finishing mixes; tolerate the presence of acids, polyvalent metal salts, amine hydrochlorides, resin curing agents; and can be mixed at both high and low temperatures with other chemical products. Further, such nonionic emulsions do not yellow white fabrics, do not change dye shades, and are generally freeze-thaw stable. As well known by those skilled in the art, these emulsions can be made of any desired particle size by varying the quantity and types of emulsifying agent.

Suitable nonionic surface active agents or emulsifiers include the alkylphenyl polyoxyethylene glycols, phenyl polyoxyethylene glycols and alkylpolyoxyethyleneglycols containing from 2 to 120 oxyethylene units and from 4 to 18 carbon atoms in the alkyl group when present. Suitable anionic surface active agents include alkali metal salts of alkyl aryl sulfonates, such as sodium dodecyl benzene sulfonate, sodium diamyl naphthalene sulfonate, disodium 4-dodecyloxydi(benzenesulfonate), etc.; alkali metal salts of alkyl sulfates, such as sodium lauryl sulfate, sodium myristyl sulfate, etc. Suitable cationic surface active agents include quaternary ammonium salts, such as N,N-dimethyl-N,N-distearyl ammonium chloride, N-methyl-N,N,N-tristearyl ammonium chloride, etc. For the most part, the most advantageous surface active agent or agents depends on the end use of the composition.

For example, nonionic surface active agents having a hydrophilelipophile balance (HLB) in the range of about 8 to 14 (preferably about 11 to 13) are best for use in durable press textile finishes. The "HLB" of a surface active agent is an expression of its hydrophile-lipophile balance, that is, the balance of the size and strength of the hydrophilic polar groups and the lipophilic, non-polar groups of the surface active agents. A lipophile surface active agent usually has a relatively low HLB number (below 9.0) and one that is hydrophilic will have a high HLB number (above 11.0). Those in the range of 9 to 11 are considered intermediate as to their hydrophile-lipophile balance.

When two or more surface active agents are blended, the resulting HLB of the blend is easily calculated. For example, to determine the HLB of a blend comprising 70% of a surface active agent having an HLB of 15 and 30% of a surface active agent having an HLB of 4.3, the calculations would be:

HLB surface active agent 70% × 15.0 _____ 10.5
HLB surface active agent 30% × 4.3 _____ 1.3

HLB of blend _____ 11.8

The preferred nonionic surface active agents for use in durable press finishes within the indicated HLB range include linear long chain primary alcohol ethoxylates, such as linear primary alcohol (C 16–18) ethoxylate (65% by weight) solid under the name Alphonic 1618–65; linear primary alcohol (C 16–20) ethoxylate (70% by weight) sold under the name Alphonic 1620–70; polyoxyethylene (6) tridecyl ether, sold under the name Renex the name Triton X–100; polyoxyethylene (4) lauryl ether, sold under the name Brij 30; polyoxyethylene (2) oleyl ether, sold under the name Brij 92; polyoxyethylene (2) oleyl ether, sold under the name Brij 98, etc. If desired, various other phenoxy or alkyl substituted phenoxy polyethylene glycols can be used.

In some textile applications, it may be desirable to use the typical cationic softeners, such as dimethyldistearyl ammonium chloride, tristearylmethyl ammonium chloride, etc. for their known softening effect on textiles. In general, it is preferred that these cationic surface active agents be used in conjunction with nonionic surface active agents. For use in latex floor polishes, it is usually desirable to emulsify the long-chain halohydrin with nonionic surface active agents and/or mixtures of nonionic surface active agents and anionic surface active agents.

The optimum concentration of surface active agents depends in part on any other components in the emulsion and upon the surface active agent or agents employed. In general, the surface active agent should be employed in a concentration of at least 15 parts by weight, preferably 30 parts, per each 100 parts by weight long-chain halohydrin to form a stable emulsion. As indicated, the maximum concentration of surface active agent depends primarily on the requirements of other components of the emulsion, such as polyethylene, etc.

The halohydrin can comprise about 0.2% to 60% by weight of the aqueous emulsion. The optimum concentration varies with the end use. Typically, for textile uses, the halohydrin comprises from about 0.2% to 20% by weight of the aqueous emulsion.

While the halohydrin used in this invention can be prepared by any known techniques, such as that described in U.S. Pat. 3,598,874, the preferred method of forming an emulsifiable halohydrin comprises the steps of (1) emulsifying a normally solid olefin having on an average from 20 to 50 carbon atoms in water with a compatible surface active agent at a temperature above the melting point of said olefin thereby forming an aqueous liquid olefin emulsion, (2) reacting said emulsified, liquified olefin with between 0.45 and 0.75 mole, preferably from about 0.50 to 0.70 mole of hypohalite having a molecular weight between 52 and 97 (hypochlorite or hypobromite) per mole of olefinic unsaturation to form a metastable haloyhdrin emulsion, (3) partitioning the resulting halohydrin from the aqueous phase to form a salt-free product. Unlike the method described in U.S. Pat. 3,598,874, the emulsion is formed with a surface active agent and no organic solvent is necessary to maintain the olefin in a reactive state. However, since the olefins used in this invention are all normally solid at room temperature, it is essential that the hypohalite reaction be carried out under conditions where the olefin and hypohalite are in intimate contact. To obtain this intimate contact, it is necessary that the hypohalite reaction be carried out in the presence of a compatible surface active agent and that the reaction be carried out at a temperature at which the olefin is in a liquid state.

Surprisingly, we have found that if the emulsified olefin is reacted with 0.45 mole or less of hypohalite per mole of olefinic unsaturation or 0.75 mole or more of hypohalite per mole of olefinic unsaturation, a stable halohydrin emulsion is formed and it is extremely difficult to separate the halohydrin from hypohalite reaction by-products. On the other hand, when reacted with between 0.45 and 0.75 mole, preferably about 0.50 to 0.70 mole hypohalite, the halohydrin can be readily partitioned from the aqueous phase and the hypohalite reaction by-products, particularly salt. This is very important in compositions for use in treating durable press fabrics. Failure to remove salt for this end use results in fabrics having a rough hand. For other end uses where salt concentration is relatively unimportant, the mole ratio of hypohalite to olefinic unsaturation can range from about 0.3 to 0.9 mole per mole of olefinic unsaturation.

In somewhat greater detail, the preferred method of preparing the long-chain halohydrin comprises emulsifying a long-chain olefin having on an average from about 20 to 50 carbon atoms, preferably 32 to 40 carbon atoms, in water with a nonionic surface active agent having an HLB of 8 to 14, preferably 11 to 13 at a temperature above the melting point of the olefin to form an aqueous emulsion, reacting the emulsified, liquified olefin with 0.50 to 0.70 mole of hypohalite having a molecular weight between 52 and 97 (hypochlorite or hypobromite) per mole of olefinic unsaturation to form a metastable vicinal halohydrin emulsion, allowing the metastable halohydrin emulsion to stand in a quiescent state to separate the halohydrin phase from the aqueous phase and partitioning the halohydrin from the aqueous phase to form a substantially salt-free product.

As indicated above, the long-chain olefin contains on an average from about 20 to 50 carbon atoms on a weight basis, preferably 32 to 40 carbon atoms. In general, the longer the olefin chain, the better the softening or plasticizing properties of the halohydrin and the softer the hand of fabrics treated with the halohydrin. While any olefin falling within this range can be used, a commercially available mixture of olefins sold under the name $C_{30}^+$ olefin fraction by the Gulf Oil Company is particularly suitable because of its low cost and the excellent plasticizing and softening properties of the halohydrin. This olefin fraction has over 50 percent by weight olefins having from 32 to 40 carbon atoms. If desired, Gulf's lower molecular weight $C_{22}$ to $C_{28}$ olefin fraction can be used.

Any of the nonionic surface active agents described spura having an HLB of 8 to 14, preferably 11 to 13, can be used to emulsify the olefin during the hypohalite reaction. These nonionic surface active agents are preferred since they seem to be particularly well suited for the formation of a metastable halohydrin emulsion. Further, since material balance studies indicate that these nonionic surface active agents remain with the vicinal halohydrin phase after separation of the aqueous phase, halohydrins prepared with these surface active agents can be utilized in substantially any emulsion mixture. Unlike the cationic and anionic surface active agents, these nonionic surface active agents can be utilized in conjunction with a much broader range of treating agents, as explained above. The nonionic surface active agents should be used in a concentration of approximately 0.5 to 10 parts, preferably 1 to 5 parts, by weight per 100 parts by weight of olefin with the result that the halohydrin reaction product contains at least 0.3 parts by weight surface active agent per 100 parts by weight halohydrin. In the hypohalite reaction, the optimum concentration will vary somewhat with the surface active agent or agents used and the olefin composition employed.

Because of its greater reactivity and lower cost per equal weight, hypochlorous acid is the preferred hypohalous acid for the formation of the halohydrin. The preferred method of providing hypochlorous acid is to mix chlorine into an aqueous medium thereby generating hypochlorous acid. A small proportion of the dissolved chlorine reacts with water to form hypochlorous and hydrochloric acids according to the equilibrium reaction

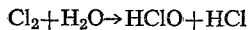
$$Cl_2 + H_2O \rightarrow HClO + HCl$$

The direct addition of chlorine to the aqueous emulsion of the long-chain olefin is a more convenient and less expensive method than preparing hypochlorous acid separately in water solution or acidifying hypochlorite solutions derived from chlorine and alkali.

The preferred method of providing hypochlorous acid is conveniently applicable to the preparation of the long-chain chlorohydrins since the chlorine is rapidly converted to hypochlorous acid and reacts rapidly with the long-chain olefin. The chlorohydrin reaction is strongly exothermic and usually liberates almost enough heat during the hypohalite reaction to maintain the long-chain olefin in a liquified condition. As the reaction proceeds, hydrochloric acid accumulates in a concentration approximately equal to the hypochlorous acid consumed. However, the development of strong acidity does not lower the quality of the chlorohydrin reaction product.

Numerous alternative methods of forming hypochlorous acid are described in commonly assigned U.S. patent Serial No. 3,346,563, which is incorporated by reference.

Aqueous hypobromous acid can be prepared in the same manner as hypochlorous acid. It is also readily prepared by stirring for 30 minutes at 5° C. a mixture of 15 parts by weight of yellow mercuric oxide, 400 parts by weight of water and 18 parts by weight of bromine, then filtering from insoluble mercuric salt. The neutral, light yellow, faintly acidic filtrate assays about 0.27 normal hypobromous acid by iodometric titration and is stable for several hours at 3 to 5° C.

Effective long-chain halohydrin substitutes have been produced by reacting the long-chain olefin with from about 0.3 to 0.9 moles of hypohalite per mole of olefinic unsaturation. However, as explained above, it is extremely difficult to separate the halohydrin from the aqueous phase unless the mole ratio of hypohalite to olefin is maintained between 0.45 and 0.75 moles, preferably from about 0.50 to 0.70 moles.

Typically, the olefin emulsion is produced by first forming an aqueous emulsion of surface active agent and water at a temperature above the melting point of the olefin to be reacted with hypohalite. The surface active agent can comprise about 0.2 to 20% by weight of the emulsion. The olefin is then heated to liquify it and added in a liquified state to the aqueous emulsion, which has been maintained above the melting point of the liquified olefin. The olefin can comprise about 10 to 200% by weight of the aqueous emulsion (water and surface active agent in the preformed heated emulsion). Halogen (bromine or chlorine) is preferably added below the surface of the emulsion at a rapid rate while maintaining the reaction mixture at a temperature above the melting point of the liquified olefin, usually 60–100° C. After all the halogen is added, the reaction mass is stirred for a short time to assure that the reaction has gone to completion. Typically, about 50 mole percent of the halogen reacts with the olefinic double bonds to form halohydrin groups and 50 mole percent reacts with the olefinic double bonds to form dihalo groups.

The hydrohalic acid generated during the formation of the hypohalous acid is then generally neutralized with a suitable alkali metal salt or hydroxide such as sodium hydroxide, potassium hydroxide, trisodium phosphate, sodium carbonate, etc. The neutralized reaction mixture is then allowed to stand at above room temperature, preferably 60–100° C., in a quiescent state to permit the metastable emulsion to stratify. Typically, after a short time (15 minutes to an hour) a two-phase system is formed with the heavier aqueous phase containing all of the neutralized salt and the lighter vicinal halohydrin phase containing dissolved nonionic surface active agent. The halohydrin phase can then be readily separated from the aqueous phase.

Alternatively, the neutralization step can be omitted until after the halohydrin is partitioned from the aqueous phase. In this case the aqueous phase is extremely acidic and the halohydrin phase is neutralized with a relatively small amount of an alkali metal salt such as sodium phosphate. Irrespective of whether the long-chain vicinal halohydrin is neutralized before or after separation from the aqueous phase, the resultant long-chain halohydrin is sufficiently salt-free to render it suitable for any of the aforesaid uses and is particularly suitable for use in durable press fabric finishes.

The resulting halohydrin, which contains up to 10 parts by weight surface active agent per 100 parts by weight halohydrin, can be sold to the ultimate user or supplemented with additional surface active agent and/or emulsified with water. However, as indicated above, prior to use, the halohydrin is emulsified with water and at least 15 parts by weight, preferably at least 30 parts by weight, of surface active agent per each 100 parts by weight long-chain halohydrin to form a stable aqueous emulsion containing from about 0.2 to 60% by weight halohydrin. The emulsion can be formed by substantially any means. A convenient method of forming an emulsion comprises charging halohydrin, surface active agent and any other ingredients which require emulsification into a pressure reactor, heating the composition to approximately 60 to 100° C., venting off gases, sealing the reaction chamber and heating under good shear at a temperature above the melting points of the halohydrin, such as about 60 to 160° C. to form an aqueous emulsion. Alternatively, the halohydrin can be liquified by heating and added to an aqueous emulsion. Optimum stability of the emulsion is obtained by keeping it at a pH of about 8.5 or above (8.5 to 13), preferably about pH 9 to 10. If desired, any other treating agents to be used in the halohydrin can be emulsified at the same time as the halohydrin.

As indicated above, the emulsified halohydrin can be used as a self-finish for fibrous materials. In such cases, the halohydrin and surface active agent can be applied in an emulsion containing about 0.2 to 20% by weight halohydrin.

Further, the halohydrin emulsion can comprise emulsified polyethylene, such as described in U.S. Pats. 2,153,553; 2,816,883; 2,964,487; 2,928,797; 2,917,412, etc. For use in durable press finishes, it is advantageous to employ from about 0.1 to 35% by weight of a thermosetting resin (based on the total weight of the aqueous emulsion) and a catalytic concentration of an appropriate curing catalyst. Suitable thermosetting resins include dimethylol ethylene urea, dimethylol dihydroxyethylene urea, hexamethylol melamine, melamine-formaldehyde resins, urea-formaldehyde resins, polymethylol carbamates, etc.

A typical durable press aqueous emulsion finish can comprise about 0.2 to 10% by weight halohydrin or mixture of halohydrin and polyethylene wherein the halohydrin comprises at least .2 percent by weight of the total emulsion, about 0.2 to 20%, preferably about 2 to 15% by weight, of a suitable surface active agent (preferably a nonionic surface active agent having an HLB of 11 to 13), 1 to 25% by weight thermosetting resin, and a catalytic concentration of a curing catalyst for the thermosetting resin and water.

The halohydrin emulsions of this invention, alone or together with various other treating agents, such as thermosetting resins and/or emulsified polyethylene, can be applied to fibrous materials, such as cotton, linen, rayon, polyester, nylon, polyacrylonitriles, and combinations of these materials, such as polyester cotton, etc., which may be in the form of fibers, yarns, fabrics, etc., by means of pad rolls, mangles, quetches, centrifuges, hydroextractors, etc. After impregnation, excess emulsion is removed from the textile by any of the aforedescribed means or by passing through the nip formed by two or more roll surfaces until the resultant wet add-on of the emulsion ranges from about 10 to 200% by weight based on the dry material. The impregnation may be repeated two or three times to obtain better penetration and more uniform treatment.

After the excess emulsion has been removed to the desired extent, the impregnated material is dried and/or cured where a cross-linking agent is employed. Drying and curing can be carried out in separate steps or, preferably, in a combined single step, by the application of heat to insolubilize the cross-linking material. The drying and/or curing may be carried out, for example, in ovens, on steam cans, tenter frames, hot head presses, hand irons and the like. For the preparation of durable press fabrics, where wrinkle resistance is required, curing can be carried out at about 120 to 220° C. for from one-half minute to twenty minutes, the lower temperatures requiring the longer curing cycle.

The following examples are merely illustrative and should not be construed as limiting the scope of this invention.

EXAMPLE I

This example illustrates the preparation of a preferred long-chain chlorohydrin of this invention. An aqueous emulsion of 9.3 grams of polyoxyethylene (4) lauryl ether in 375 grams water was formed at 75 to 80° C. to which a phenolphthalein indicator was added. Three hundred fifty grams of olefin having on an average between 32–40 carbon atoms was melted at 90 to 95° C. in a separate container using a steam bath. The olefin used in this example had the following properties:

TYPICAL VALUES.—COMPOSITION

Carbon number distribution by gas liquid
chromatography: Wt. percent
$C_{28}$ and below _____ 1.7
$C_{30}$ _____ 5.0
$C_{32}$ _____ 11.3
$C_{34}$ _____ 15.3
$C_{36}$ _____ 15.5
$C_{38}$ _____ 13.7
$C_{40}$ _____ 11.6
$C_{42}$ _____ 9.1
$C_{44}$ _____ 8.3
$C_{46}$ _____ 5.8
$C_{48}$ and above _____ 2.7

100.0

Olefin—type distribution by infrared
spectroscopy: Mole percent
$RCH=CH_2$ _____ 33
$R_2C=CH_2$ _____ 18
$RCH=CHR$ (cis) _____ 23
$RCH=CHR$ (trans) _____ 4
$R_2C=CHR$ _____ 22

100

Typical properties:
Melting point, ASTM D–127, ° F. _____ 181.5
Color, Saybolt, ASTM D–156 _____ −15
Specific gravity, ASTM D–70, 70°/77° F. __ 0.9667

The liquid olefin composition was then poured into the reaction flask containing the aqueous emulsion, while the mixture was constantly stirred at 75–80° C. Twenty-eight and one-tenth grams of gaseous chlorine (0.6 moles per mole of olefinic unsaturation) was bubbled into the bottom of the reaction flask over a period of 24 minutes while maintaining the reaction temperature at 75 to 80° C. with a little supplemental heating and stirred an additional five minutes after the chlorine addition was completed. Eighty-eight grams of a 24% aqueous potassium hydroxide solution was added to the reaction flask drop-wise over a period of about 10 to 15 minutes to neutralize the acidic reaction mixture, while maintaining the reaction mixture at 75 to 80° C. The long-chain chlorohydrin phase separated from the aqueous phase when the reaction mixture was allowed to stand without stirring at 75–80° C. The heavier aqueous phase was partitioned from the long-chain chlorohydrin in a separatory funnel yielding 432 grams of aqueous phase and 383 grams of long-chain chlorohydrin. The chlorohydrin had essentially the same appearance as the starting olefin composition except that it seemed to be somewhat softer. Chemical analysis indicated that approximately 30% of the double bonds in the starting olefin had been converted to chlorohydrin groups and 30% of the olefin double bonds had been converted to dichloro groups. Material balance studies indicated that the polyoxyethylene (4) lauryl ether was retained in the chlorohydrin phase.

Essentially the same results are obtained by replacing the gaseous chlorine with an equal molar concentration of liquid bromine.

EXAMPLE II

Example I was repeated with essentially the same results using (A) 0.50 moles of chlorine per mole of olefinic unsaturation and (B) 0.68 moles of chlorine per mole of olefinic unsaturation. When Example I was repeated using (C) 0.45 moles of chlorine and (D) 0.75 moles of chlorine per mole of olefinic unsaturation, the chlorohydrin did not separate from the aqueous phase.

EXAMPLE III

This example illustrates the preparation of a stable chlorohydrin emulsion softening composition capable of treating fibrous materials. Eighty grams of the chlorohydrin of Example II(A) which had been prepared with 0.5 moles of chlorine per mole of olefin, 80 grams polyethylene sold under the name Epolene E-10, 33.5 grams linear primary alcohol ($C_{16-18}$) polyoxyethylene (65% by weight) glycol (100% active ingredients), 14.5 grams polyoxyethylene(4) lauryl ether (100% active ingredient), 6 grams of aqueous potassium hydroxide (50% by weight solids) and 497 grams water was charged in a Parr bomb reactor equipped with two 6-blade agitators. After the Parr bomb was heated to 100° C., the vent was closed and heating continued until the temperature reached about 130 to 135° C. at a gauge pressure of about 40 to 48 p.s.i.g. After the temperature was maintained at about 130 to 135° C. for thirty minutes, the contents were cooled to 120° C., adjusted to pH 9 with aqueous potassium hydroxide, if the pH was below 9 and then poured into a one quart jar and sealed forming a stable long-chain chlorohydrin-polyethylene emulsion.

EXAMPLE IV

This example illustrates the preparation of a stable chlorohydrin-polyethylene emulsion softening composition capable of treating fibrous materials. Eight grams of the chlorohydrin of Example I which had been prepared with 0.6 mole of chlorine per mole of olefin, 80 grams polyethylene sold under the trade name Epolene E-10 (having a molecular weight of about 2,500, an acid number of 14.4 and saponification number of 24 to 25), 33.5 grams linear primary alcohol($C_{16-18}$)polyoxyethylene (65% by weight) glycol (100% active ingredients), 14.5 grams polyoxyethylene(4) lauryl ether (100% active ingredient), 6 grams of aqueous potassium hydroxide (50% by weight solids) and 497 grams water was charged in a Parr bomb reactor equipped with two 6-blade agitators. After the Parr bomb was heated to 100° C., the vent was closed and heating continued until the temperature reached about 130 to 135° C. at a gauge pressure of about 40 to 48 p.s.i.g. After the temperature was maintained at about 130 to 135° C. for thirty minutes, the contents were cooled to 120° C., adjusted to pH 9 with aqueous potassium hydroxide, if the pH was below 9 and then poured into a one quart jar and sealed forming a stable long-chain chlorohydrin-polyethylene emulsion.

EXAMPLE V

This example illustrates the use of a long-chain vicinal chlorohydrin emulsion of this invention as a single ingredient finish for 100% cotton fabrics. The aqueous emulsion of Example III was diluted with water to 2% by weight total solids (adding 294 grams of water to 6 grams of the emulsion) to form a padding bath and compared with a 2% by weight aqueous emulsion of a commercial polyethylene emulsion (prepared by diluting the 30% emulsion with water) sold for the same purpose. The cotton fabric was dipped into the padding bath and passed through a single nip of a Birch two-roll laboratory padder to give approximately 81 to 85% wet pick-up on the 100% cotton fabric sample. The nip pressure was set at 30 p.s.i.g. and the speed setting was 3. The cotton fabric samples were dried at 105 to 110° C. for five minutes and then conditioned at 65% relative humidity and 70° F. for at least 16 hours before testing. The following physical testing methods were used:

| Test method: | Test reference |
|---|---|
| Elmendorf tear test (warp direction only) | ASTM D 1424–63. |
| Abrasion resistance, flexing and abrasion (stroll flex, warp direction only) | ASTM D 1175–64T. |
| Reflectance, blue and whiteness of bleached fabric (whiteness) | AATCC 110–1968. |
| Stiffness of fabrics (drape flex, warp direction only) | ASTM D 1388–64 (Section 1.1.A). |

65% relative humidity and 70° F. prior to testing. The results are set forth below in Table I.

Each of the cotton samples was washed in a Kenmore automatic washer Model 600, using the permanent press cycle (10 minutes hot water-cold water rinse), using 50 grams of detergent without optical brighteners per four pound load. The washed fabrics were dried in a Kenmore drier, Model 600 for 45 minutes. The samples were subjected to five wash and dry cycles and then conditioned at TABLE I
Effect of softener as single ingredient-finish on 100% cotton fabric

| Softener identification | Tear strength, grams | Stroll flex abrasion, cycles | Drape flex in. | Color percent whiteness |
|---|---|---|---|---|
| Initial: | | | | |
| 2% Commercial polyethylene emulsion | 1,217 | 4,241 | 1.96 | 82.0 |
| Do | 1,290 | 5,096 | 1.89 | 85.0 |
| Do | 1,417 | 5,204 | 1.87 | 85.2 |
| 2% vicinal chlorohydrin emulsion | 1,600 | | 1.90 | 84.3 |
| Do | 1,251 | 4,733 | 1.91 | 83.2 |
| Do | 1,360 | 3,734 | 2.07 | 81.1 |
| Washed: | | | | |
| 2% commercial polyethylene emulsion | 940 | 1,404 | 1.74 | |
| Do | 837 | 1,258 | 1.67 | 85.8 |
| Do | 794 | 1,635 | 1.81 | 85.1 |
| 2% vicinal chlorohydrin emulsion | 897 | 1,013 | 1.82 | 84.5 |
| Do | 926 | 1,203 | 1.58 | 83.2 |
| Do | 816 | 875 | 1.68 | 77.5 |

The above data clearly show that the vicinal chlorogredient softener finish on textile fabrics.

EXAMPLE VI

This example illustrates the use of the long-chain vicinal chlorohydrin softening compositions in durable press fabric finishes. A durable press finish bath was prepared for 65% polyester/35% cotton broadcloth by mixing 75 grams of an aqueous thermosetting resin composition sold under the name Permafresh 183 (45% dry solids basis dimethylol dihydroxyethylene urea), 9 grams of a 30% emulsion of the softening composition to be tested (30% solids vicinial chlorohydrin-polyethylene emulsion of Example IV or a 30% solids commercial polyethylene emulsion sold for this purpose), 3 grams of a 10% aqueous solution of Triton X–100 and 10.8 mls. of a zinc hexanitrate catalyst (containing 0.5 grams per 100 ml.) in sufficient water to make a 300 gram padding bath. The samples were treated in essentially the same manner as employed in Example V resulting in a wet pick-up on the polyester/cotton broadcloth of 78 to 82%. After the fabric was dried in the manner described in Example V, it was cured at 174 to 180° C. for ten minutes. The samples were then conditioned in the same manner as in Example V or washed five times before testing. The results are set forth below in Table II.

TABLE II

Softener influence in durable press treated 65 polyester/35 cotton blend fabric

| Softener identification | Tear strength, grams | Stroll Flex abrasion, cycles | Drape flex, in. | Color, percent whiteness |
|---|---|---|---|---|
| Initial: | | | | |
| 3% Commercial polyethylene emulsion | 1,817 | 6,590 | 2.99 | 50.4 |
| Do | 1,699 | 5,307 | 2.78 | 45.4 |
| Do | 1,501 | 5,080 | 2.72 | 37.0 |
| 3% vicinal chlorohydrinpolyethylene emulsion | 1,635 | 5,010 | 2.77 | 49.2 |
| Do | 1,665 | 5,138 | 2.75 | 40.3 |
| Do | 1,646 | 5,098 | 2.78 | 47.5 |
| Do | 1,610 | 4,960 | 2.72 | 46.0 |
| Washed: | | | | |
| 3% commercial polyethylene emulsion | 1,783 | 5,888 | 1.61 | 60.4 |
| Do | 1,305 | 5,140 | 1.54 | 54.9 |
| Do | 1,648 | 4,907 | 1.72 | 56.4 |
| 3% vicinal chlorohydr in polyethylene emulsion | 1,478 | 5,381 | 1.54 | 55.5 |
| Do | 1,795 | 5,250 | 1.76 | 59.8 |
| Do | 1,721 | 5,160 | 1.74 | 58.9 |
| Do | 1,766 | 5,012 | 1.73 | 55.8 |

The above data clearly shows that the vicinal chlorohydrin softener of this invention is useful in durable press finishes.

Since many embodiments of this invention may be made and since many changes may be made in the embodiments described, the foregoing is to be interpreted as illustrative only and this invention is defined by the claims appended hereafter.

What is claimed is:

1. An aqueous emulsion comprising a surface active agent selected from the group consisting of anionic, cationic and nonionic surface active agents including alkyphenyl polyoxyethylene glycols, phenyl polyoxyethylene glycols, and alkyl polyoxyethylene glycols containing from 2 to 120 oxyethylene units and from 4 to 18 carbon atoms in the alkyl group when present, said anionic surface active agents including alkali metal salts of alkyl aryl sulfonates, sodium dodecyl benzene sulfonate, sodium diamyl naphthalene sulfonate, disodium 4 - dodecyloxydi (benzenesulfonate), sodium lauryl sulfate, sodium myristyl sulfate, said cationic surface active agents including quaternary ammonium salts, including N,N dimethyl-N,N-distearyl ammonium chloride, N-methyl-N,N,N-tristearyl ammonium chloride and a long-chain vicinal halohydrin, having from about 20 to 50 carbon atoms, said surface active agent being present in a concentration of at least 0.3 parts by weight per 100 parts by weight of halohydrin and said halohydrin being selected from the group consisting of chlorohydrins and bromohydrins where said emulsion is at a pH of at least 8.5.

2. The composition of claim 1, wherein said surface active agent is a nonionic surface active agent selected from the group consisting of linear long chain primary alcohol ethoxylates such as a linear primary alcohol ethoxylate having 16–20 carbon atoms, polyoxyethylene tridecyl ether, octylphenyl polyoxyethylene glycol, polyoxyethylene laurylether, polyoxyethylene oleyl ether, phenoxy polyethylene glycols, alkyl substituted phenoxy polyethylene glycols, said nonionic surfactant having a hydrophile-lipophile balance of about 8 to 14.

3. The composition of claim 2, wherein said halohydrin is a chlorohydrin and at least 50% by weight of said chlorohydrin has from 32 to 40 carbon atoms.

4. An aqueous emulsion comprising a surface active agent selected from the group consisting of anionic, cationic and nonionic surface active agents including alkyphenyl polyoxyethylene glycols, phenyl polyoxyethylene glycols, and alkyl polyoxyethylene glycols containing from 2 to 120 oxyethylene units and from 4 to 18 carbon atoms in the alkyl group when present, said anionic surface active agents including alkali metal salts of alkyl aryl sulfonates, sodium dodecyl benzene sulfonate, sodium diamyl naphthalene sulfonate, disodium 4-dodecyloxydi(benzenesulfonate), sodium lauryl sulfate, sodium myristyl sulfate, said cationic surface active agents including quaternary ammonium salts, including N,N dimethyl-N,N-distearyl ammonium chloride, N-methyl-N,N,N tristearyl ammonium chloride and from 0.2 to 60 percent by weight of an aliphatic vicinal halohydrin containing on an average from about 20 to 50 carbon atoms, wherein the halo group of said halohydrin is selected from the group consisting of chloro or bromo, said halohydrin being prepared from the reaction of an olefin, having from 20–50 carbon atoms, said olefin being normally solid at room temperature, and hypohalite in a liquid medium wherein said emulsion is at a pH of at least 8.5.

5. The composition of claim 4, wherein said halohydrin is a chlorohydrin and said surface active agent is present in a concentration of at least 15 parts by weight per 100 parts by weight halohydrin.

6. The composition of claim 5, wherein said surface active agent comprises a nonionic surface active agent having a hydrophile-lipophile balance of 8 to 14.

7. The composition of claim 5, wherein said halohydrin includes emulsified polyethylene having 20–50 carbon atoms average per molecule.

8. The method of forming a long-chain vicinal halohydrin comprising the step of (1) emulsifying a normally solid olefin having from 20 to 50 carbon atoms in water with a compatible surface active agent at a temperature above the melting point of said olefin thereby forming an aqueous liquid olefin emulsion, (2) reacting the liquified olefin with between 0.45 and 0.75 moles of hypohalite per mole of olefinic unsaturation to form a metastable halohydrin emulsion, said hypohalite selected from the group consisting of hypochlorite and hypobromite and (3) partitioning the resultant vicinal halohydrin from the aqueous phase to form a salt-free product.

9. The process of claim 8, wherein the liquified olefin is reacted with about 0.50 to 0.70 moles of hypohalite per mole of olefinic unsaturation.

10. The process of claim 9, wherein said hypohalite is hypochlorite.

11. The process of claim 10, wherein said surface active agent is present in a concentration of approximately 0.5 to 10 parts by weight per 100 parts by weight of olefin.

12. The process of claim 11, wherein said surface active agent comprises a nonionic surface active agent having a hydrophile-lipophile balance of 11 to 13.

13. The process of claim 10, wherein at least 50% by weight of said olefin contains from 32 to 40 carbon atoms.

References Cited

UNITED STATES PATENTS 2,260,547  10/1941  Valik  260—634
3,598,874  8/1971   Kloss  260—634

OTHER REFERENCES

Chem. Abstracts, 50: 13,763h, 1956.

THEODORE MORRIS, Primary Examiner

U.S. Cl. X.R.

117—138.8 F, 138.8 N, 138.8 UA, 139.5 CQ, A; 260— 29.2N 29.6 CW, 634

UNITED STATES PATENT OFFICE
CERTIFICATE OF CORRECTION

Patent No. 3,782,987            Dated January 1, 1974

Inventor(s) William A. Bomball, Raymond L. Drury, Charles S. Nevin and Ralph C. Witmer II It is certified that error appears in the above-identified patent and that said Letters Patent are hereby corrected as shown below:

Column 1, line 61, for "hydrophobic, a relatively" read ---hydrophobic, relatively---.
Column 2, line 37, for "partitioning and halohydrin" read ---partitioning the halohydrin---.
Column 3, line 70, for "solid" read ---sold---.
Column 3, bridging lines 73/74, for "Renex the name" read --- Renex 36; octylphenyl polyoxyethylene (9,10) glycol, sold under the name---.
Column 5, line 30, for "spura" read ---supra---.
Column 10, lines 17-28, for "65% relative humidity...conditioned at" read ---Each of the cotton samples was washed in a Kenmore automatic washer Model 600, using the permanent press cycle (10 minutes hot water - cold water rinse), using 50 grams of detergent without optical brighteners per four pound load. The washed fabrics were dried in a Kenmore drier Model 600 for 45 minutes. The samples were subjected to five wash and dry cycles and then conditioned at 65% relatively humidity and 70°F. prior to testing. The results are set forth below in Table I.
Column 10, bridging lines 53/54, for "chloro-gredient" read ---chlorohydrin softener of this invention is useful as a single ingredient---.
Column 12, line 39, for "hypohalite selected" read ---hypohalite being selected---.

Signed and sealed this 23rd day of July 1974.

(SEAL)
Attest:

McCOY M. GIBSON, JR.            C. MARSHALL DANN
Attesting Officer            Commissioner of Patents